United States Patent [19]

Miner et al.

[11] 4,090,581
[45] May 23, 1978

[54] CARRIER VEHICLE STEERING SYSTEM

[75] Inventors: Earl L. Miner, Long Lane; Harold G. Jones, Lebanon, both of Mo.

[73] Assignee: Detroit Tool and Engineering Company, Lebanon, Mo.

[21] Appl. No.: 738,730

[22] Filed: Nov. 4, 1976

[51] Int. Cl.² ............................................. B62D 5/04
[52] U.S. Cl. .................................... 180/140; 280/419
[58] Field of Search .................. 180/132, 140, 23, 24, 180/46, 66 R; 280/408, 419, 442, 443, 444, 691, 693, 696, 670, 672, 103

[56] References Cited

U.S. PATENT DOCUMENTS

| 2,865,034 | 12/1958 | Petite | 180/140 X |
|---|---|---|---|
| 3,604,528 | 9/1971 | Williamson | 180/140 |
| 3,972,379 | 8/1976 | Norris | 180/140 |

Primary Examiner—Joseph F. Peters, Jr.
Assistant Examiner—R. Schrecengost
Attorney, Agent, or Firm—Cohn, Powell & Hind

[57] ABSTRACT

This vehicle includes a steering system, which is adaptable for use with self-propelled and trailer vehicles to provide a compact, low-profile carrier for both personnel and cargo, and is mounted to the vehicle to ensure a floor and fender system providing optimum carrying capacity. The steering system controls all four wheel units and includes an actuating member mounted to the vehicle body and actuating the wheel units by a swiveling system. The swiveling system incorporates an intermediate rotating mechanism mounted to the body adjacent each wheel unit and within the fender wells, and permits effective swiveling of the wheel units by swiveling system elements located below the floor system and within the fender wells.

The self-propelled embodiment of the vehicle is provided with two-wheel, four-wheel and crab steering modes and the mode change is effectuated by a hydraulically operated steering system controlled by a valve operated in conjunction with a visual indicator which ensures correct wheel alignment when the mode change is effectuated.

The trailer vehicle is provided with a simple steering linkage connecting the front and rear wheel units together to effectuate a four-wheel steering mode and includes steering actuating members at each end to provide front or rear hitch capability to facilitate towing of a train of trailer vehicles.

34 Claims, 21 Drawing Figures

CARRIER VEHICLE STEERING SYSTEM

BACKGROUND OF THE INVENTION

This invention relates generally to a carrier vehicle and particularly to a steering system for such a vehicle.

Vehicles having multiple steering modes are not in themselves new and several patents disclose vehicles of this general type. Such vehicles include various improvements on the multiple mode principle. For example, one such patent discloses a hydraulic steering system having a selector valve actuated by solenoids and controlled by a switching system which prevents a mode change unless the front and rear wheels are in parallel alignment with the longitudinal axis of the vehicle. Several other patents disclose variations on this valve switching, however, none of them discloses a simple visual indicator system capable of eliminating problems inherent in steering mode change.

Vehicles incorporating multiple mode steering systems tend to provide linkage which turns the wheels directly about a vertical swivel axis. The result of this has been that such mechanism is essentially structurally organized in one horizontal plane and this arrangement, while suitable for straddle type vehicles, is a distinct disadvantage for low profile vehicles suitable for use in underground mines.

Although the advantages of providing four-wheel steering on self-propelled vehicles are well recognized, the advantages of providing four-wheel control on trailer vehicles, and more particularly on a train of towed vehicles, do not appear to be appreciated. Certainly, the systems referred to above are generally far too complicated to be economical or feasible for utilization in a trailer vehicle.

The above disadvantages and limitations inherent in known steering systems have been overcome by the present device in a manner neither disclosed or suggested in prior vehicles of this type.

SUMMARY OF THE INVENTION

This carrier vehicle provides a steering system which can be readily adapted to suit self-propelled and trailer type vehicles, and is extremely compact while providing optimum usable carrier space.

The vehicle steering system linkage controlling the swiveling movement of the wheels is particularly adapted to suit low profile vehicles which can be used in a confined environment such as exists in underground mines.

This carrier vehicle provides a vehicle body having front and rear vertical swivel axes and associated pivot axes; wheel units mounted for rotation about the swivel axes and a steering system which includes an actuating member mounted to the body, intermediate vertical shaft assemblies mounted to the body and rotatable about the pivot axes, and linkage mechanism connecting the actuating member to the shaft assemblies and the shaft assemblies to the wheel units.

The steering system linkage connecting the actuator member to the vertical shaft assemblies lies in a different plane from that of the linkage connecting the vertical shaft assemblies to the wheel units to facilitate swiveling of said units.

The vehicle includes front and rear fender wells provided at each corner of a load carrying floor panel. The fender wells house the wheel units, the vertical shafts and the upper portion of the linkage mechanism, and the floor panel houses the lower portion of the linkage mechanism.

The steering system linkage provides a means whereby the turning radius of the inner wheels is smaller than the turning radius of the outer wheels thereby facilitating the turning action.

The steering system is adaptable for multiple and single mode steering. When used with a multiple mode steer, self-propelled vehicle, the steering system is hydraulically operated and includes a unique indicator system whereby the front and rear wheel swivel alignment can be accurately gauged to effectuate a steering mode change without the need for elaborate switching mechanism.

The indicator system for visually indicating the relative swivel alignment of the front and rear wheel units is used in conjunction with a manually operated control valve.

The vehicle can be provided with towers over each wheel unit housing at least part of the suspension system and being adapted to provide a roll bar and carrying rack assembly.

The vehicle can also be provided with removable side closure doors hingedly attached to the floor panel to provide loading ramp members and rapidly removable seats to provide optimum carrying capacity.

The vehicle can be adapted to provide a trailer vehicle having steering actuating members at the front and rear ends to permit the vehicle to be hitched at either end so that the steering linkage mechanism can be actuated whether the vehicle is towed from the front end or the rear end, said actuator members also permitting a train of trailers to be connected together.

Whether embodied in a self-propelled or trailer vehicle, the steering system provides a vehicle which is relatively inexpensive to manufacture and yet is simple to operate and maintain.

DESCRIPTION OF THE PREFERRED EMBODIMENT

Figure 1:
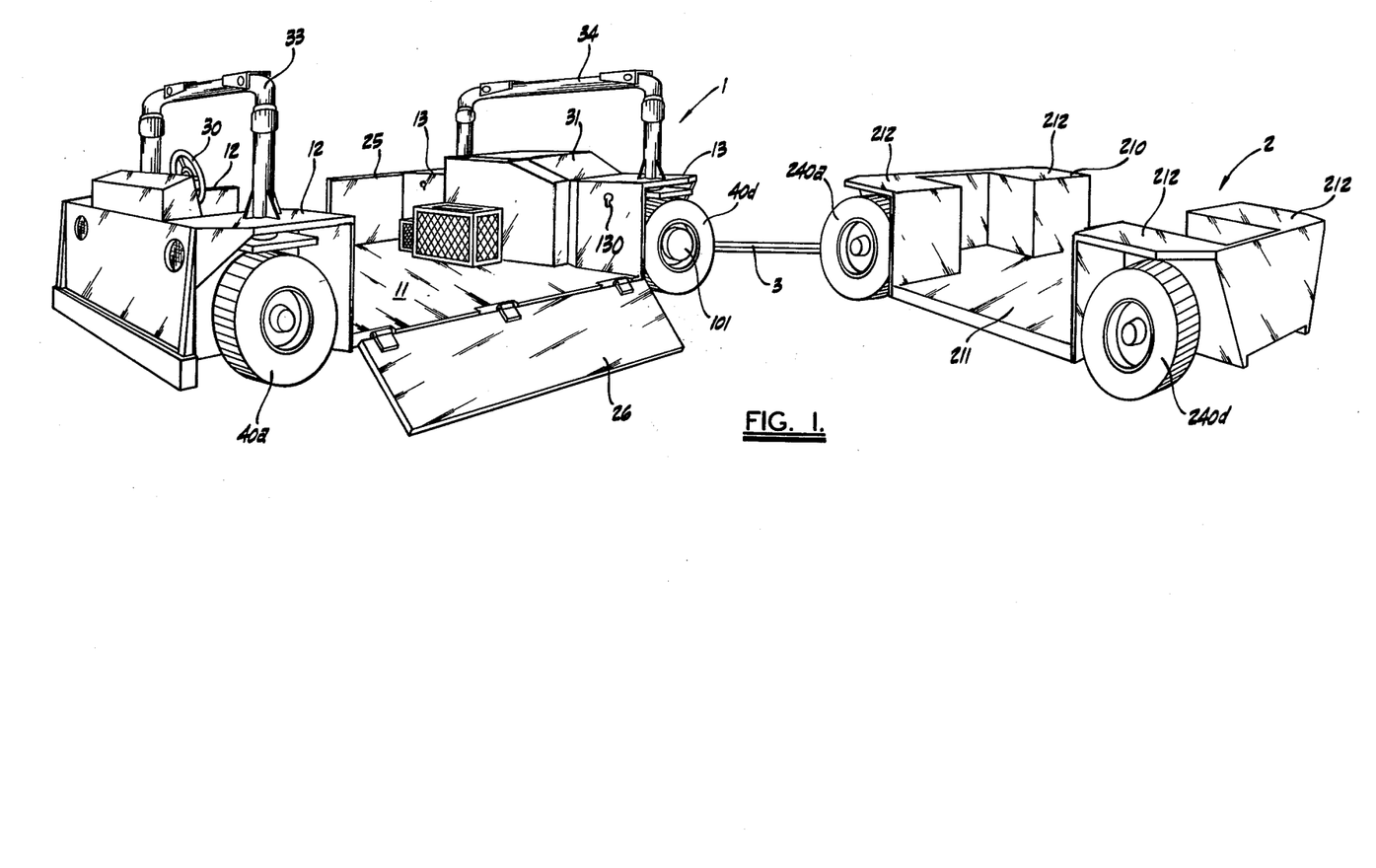
FIG. 1 is a perspective view illustrating the self-propelled vehicle and the trailer vehicle hitched together.
Figure 2:
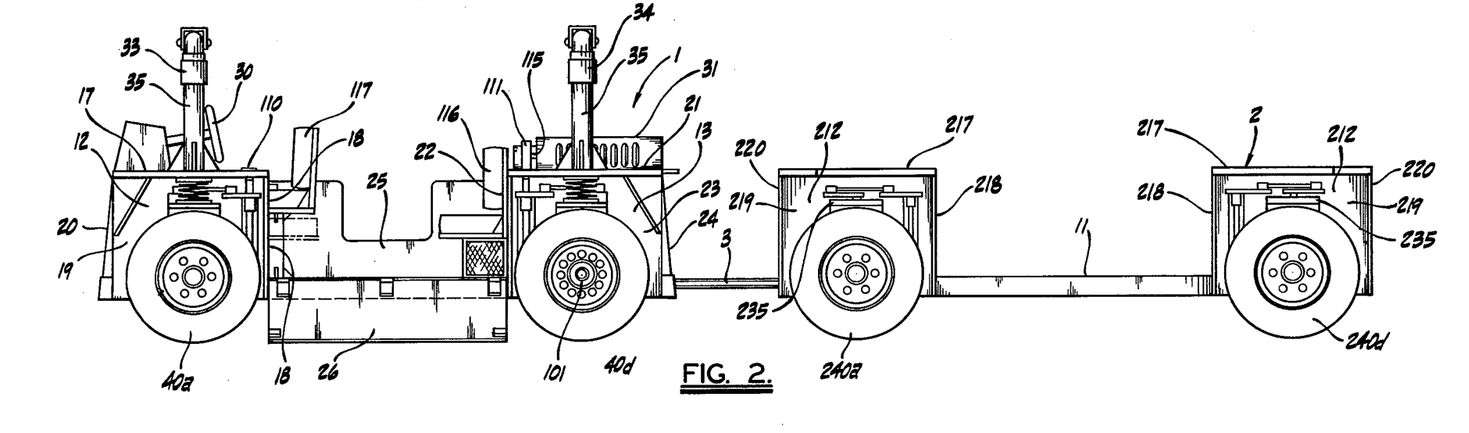
FIG. 2 is a side elevational view of the two hitched vehicles.
Figure 3:
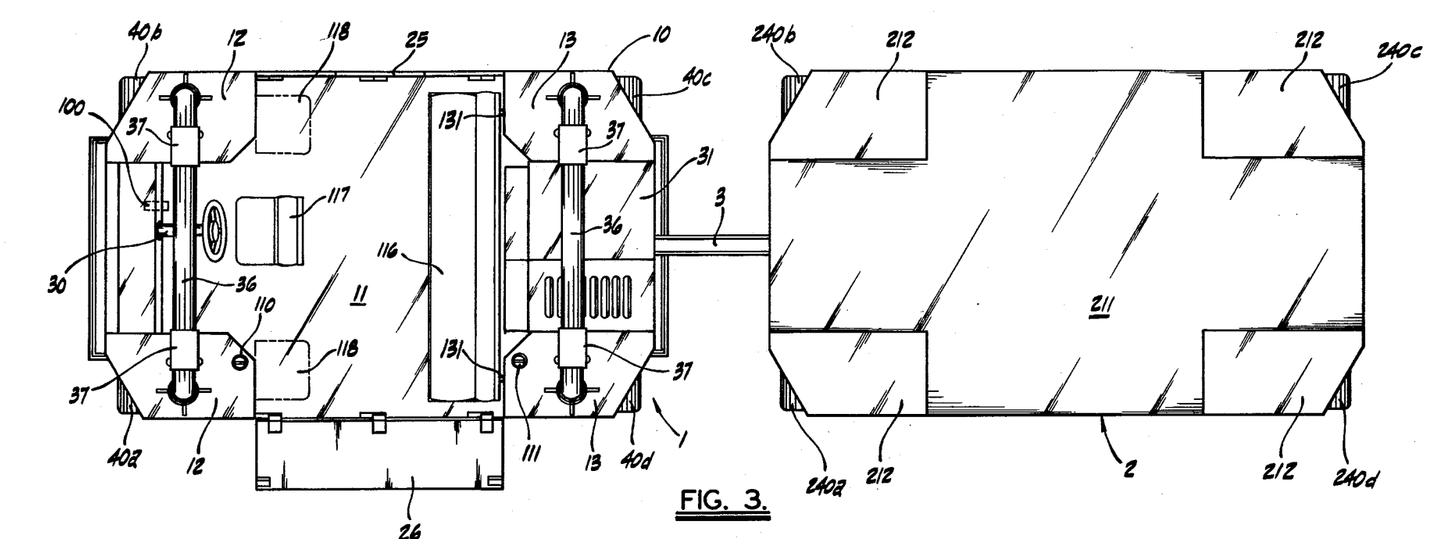
FIG. 3 is a plan view illustrating the two hitched vehicles.

Referring now by characters of reference to the drawings and first to FIGS. 1-3, it will be understood that FIG. 1 illustrates a self-propelled, personnel carrier vehicle, generally indicated by numeral 1, used in conjunction with a trailer personnel carrier vehicle, generally indicated by numeral 2, said self-propelled vehicle 1 and trailer vehicle 2 being interconnected by a hitch 3.

The two vehicles will be described separately, commencing with the self-propelled vehicle 1, which is adapted to provide two-wheel, four-wheel and crab steering modes.

Self-propelled Vehicle

Figures 9, 10, 16:
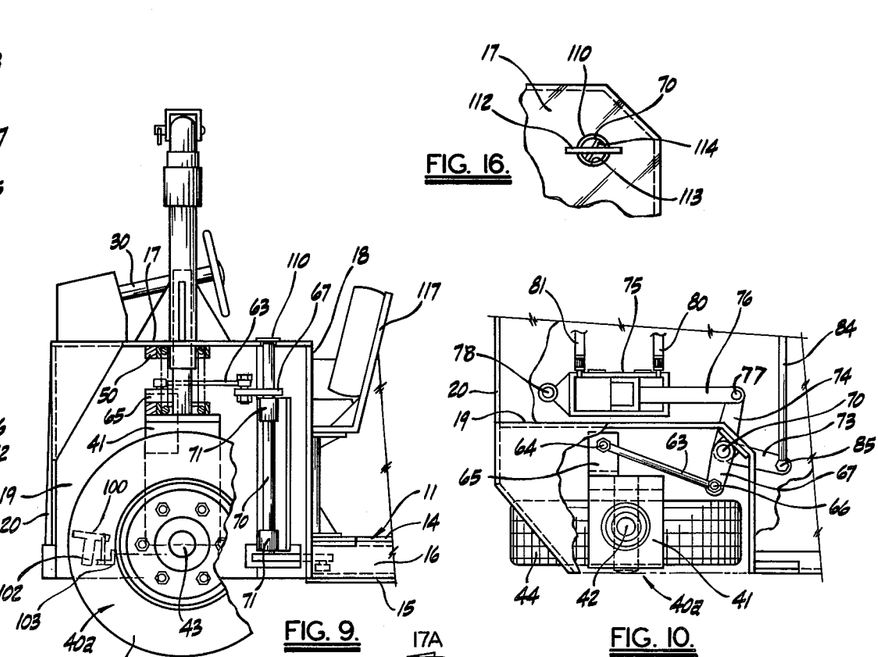
FIG. 9 is an enlarged, fragmentary side elevational view of said vehicle.
FIG. 10 is an enlarged, fragmentary plan view of said vehicle.
FIG. 16 is an enlarged, fragmentary view of the visual indicator assembly.

The self-propelled vehicle 1 is shown in FIGS. 1-10. As best shown in FIGS. 2 and 3, said vehicle includes a body 10, which consists essentially of a floor panel 11 having opposed pairs of front and rear fender wells, 12 and 13 respectively, substantially symmetrically disposed about the longitudinal and transverse axes of said body and connected to the floor panel 11 at the four corners thereof, as by welding. In this manner the floor panel and the fenders combine to form a substantially unitary structure. The floor panel 11, see FIG. 9, is formed from an upper floor plate 14, a lower skid plate 15, and a steel beam frame 16 disposed therebetween. Said skid plate acts to protect steering system components mounted beneath the floor plate from damage, which might otherwise be caused by rocks and the like, as will appear. The front fender wells 12 are formed from upper plates 17, fender side plates 18 and inboard plates 19, and are interconnected by a front bumper assembly 20. The rear fender wells 13 are likewise formed from upper plates 21, fender side plates 22 and inboard plates 23 and are interconnected by a rear bumper assembly 24.

A steering wheel 30 is disposed between the front fender wells 12, and a motor unit 31 is disposed between the rear fender wells 13. Removable side door plates 25 and 26 are hingedly attached to the floor panel 11 as will be later described. Front and rear roll bar units 33 and 34 are provided which include tower members 35, welded to the front and rear upper plates 17 and 21 respectively, and bight members 36 which are fixedly attached to the tower members 35 and carry pivoted retaining arms 37, which cooperate with the bight members to define a carrying rack. The roll bar tower members 35 form part of the body 10 and provide mounting means, which define vertical swivel axes receiving individual wheel units in swivel relation. The wheel units, generally indicated by numerals 40a, 40b, 40c and 40d, will now be described.

The four wheel units are essentially identical and will be described with reference to the front right unit 40a shown in FIGS. 8-10 and FIG. 15. Wheel unit 40a includes a yoke member 41 having a vertical swivel shaft 42 and a horizontal wheel shaft 43 fixedly attached thereto, and said horizontal shaft receives a ground wheel 44 in rotatable relation. Each tower member 35 is provided with an inner sleeve bushing 45 having a grease seal at 46 at the lower end and said vertical wheel shaft is rotatively received within the tower bushing 45 in swivel relation to the body 10. A shock absorber 47 is pin-connected to the upper end of the shaft 42 and attached to a plug 48 disposed at the upper end of said bronze bushing 45 by a nut 49. The yoke member 41 and the underside of the fender top plate 17 are provided with retainer pockets 50 and 51, respectively, to receive opposite ends of a coil spring 52, the coil spring being separated from said fender plate by a pair of friction discs 53, said spring and said shock absorber cooperating to provide suspension means.

The swivel movement of each of the wheel units 40 is controlled by the steering assembly which includes the steering wheel unit 30, constituting an actuating means, and a cooperating swiveling mechanism which operatively connects the steering wheel unit 30 to the wheel units 40. The steering means will now be described with reference to the schematics represented by FIGS. 4-7.

Figure 4:
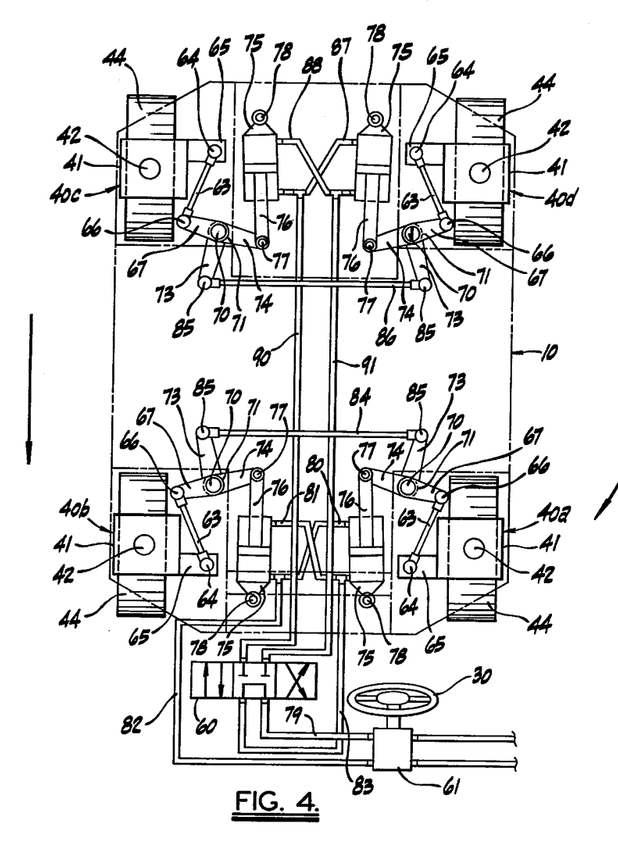
FIG. 4 is a schematic illustrating the steering mechanism of the self-propelled vehicle with the front and rear wheels in parallel alignment.

Extremely high maneuverability of the truck is obtained by the selection of any one of three steering modes. The three steering modes are standard two-wheel steer (FIG. 5); four-wheel steer (FIG. 6); and a diagonal or crab steering (FIG. 7). Thw swiveling mechanism, which constitutes a swiveling means, comprises a combination of hydraulic and linkage components which are controlled by a three position, hand-operated control valve 60 located on the instrument panel. The components will be described initially with reference to FIGS. 4 and 8-10. FIG. 4 illustrates the disposition of the swiveling mechanism with all wheels aligned in parallel relation. The swiveling mechanism linkage components are, in general, symmetrically disposed both longitudinally and transversely and for this reason, like parts are given the same reference numeral. Essentially, the yoke 41 of each wheel mounting unit 40a, 40b, 40c and 40d is pivoted about its associated swivel shaft 42 by means of the swiveling mechanism which includes link member 63 attached by means of a pivot connection 64 to an eccentric bracket 65 forming part of said yoke. The other end of said member 63 is attached by means of a pivot connection 66 to the remote end of an arm 67 fixedly attached to the upper end of a vertical pivot shaft 70. The pivot shaft 70 constitutes a rotating means and is journal-mounted within spaced sleeves 71, see FIG. 10, attached as by welding to the body 10 at the corner of an associated fender well for rotation about a pivot axis disposed in spaced relation from the axis of rotation of the swivel shaft 42. A bell crank formed from arms 73 and 74 is fixedly attached to the lower end of the shaft 70. It will be understood that rotation of said shaft 70 about its vertical axis, as by applying a force to said bell crank arm 74, results in rotation of said upper arm 67 and hence, by virtue of the inclined link member 63 connected between said arm and said bracket 65, results in the swiveling of the wheel mounting unit 40a, and attached wheel 44, about the swivel axis defined by the vertical shaft 42, said link member 63 and said arms 65 and 67 constituting means connecting said shafts 70 and 42. In the preferred embodiment the arm 74 is rotated by means of a double-acting hydraulic cylinder 75 and piston 76, which constitutes a hydraulic ram, said piston 76 being attached to the end thereof by pivot connection 77, the cylinder 75 being pivotally mounted to the body 10 by pivot connection 78.

Fluid is supplied to opposite ends of the cylinder 75 by hydraulic lines 80 and 81 respectively. Line 80 is connected to a power steering directional valve 61, forming part of the steering wheel unit 30, by means of line 82; and line 81 is connected to the control valve 60 by means of a line 83. The control valve 60 is selectively connected to valve 61 by line 79. It will be understood that the directional valve 61 receives fluid from a fluid supply (not shown). The swiveling mechanism associated with the wheel unit 40a is connected to that associated with unit 40b, by means of a transverse link member 84 pivotally connected between associated arms 73 by pivot connections 85.

The swiveling mechanism components for rear wheel units 40c and 40d are identical with those for the front wheel units 40a and 40b, except that cylinders 75 are interconnected by hydraulic lines 87 and 88, which are connected by lines 90 and 91 respecitvely to the control valve 60. The swiveling mechanism associated with wheel unit 40c is connected with that associated with unit 40d by means of link member 86 pivotally connected between associated arms 73. It will be understood that the linkage connecting the hydraulic cylinder pistons 76 to the shafts 70 and the associated hydraulic lines and the control valve 60 constitutes means connecting the steering wheel unit 30 to the wheel units 40.

Figure 5:
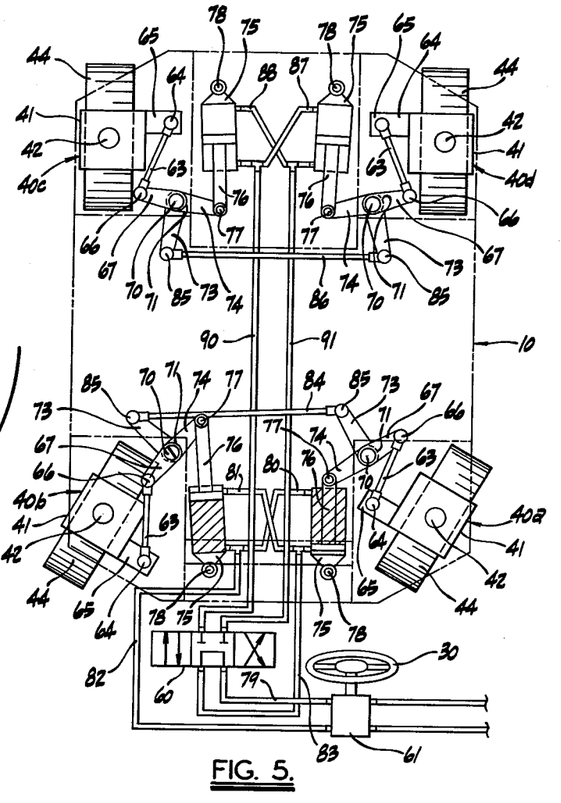
FIG. 5 is a similar schematic illustrating the two-wheel steering mode.

FIG. 5 illustrates the two-wheel steering mode. This mode is accomplished by selectively manually switching the rear hydraulic cylinders 75 out of the hydraulic circuit by means of control valve 60. In this switching position, during right hand steer, fluid is directed from the power steering directional valve 61 via pressure line 82 and line 80 to the rear port of cylinder 75 of unit 40a, and to the head port of cylinder 75 of unit 40b. Return is via lines 81, 83, diversion through the valve 61, and line 79. During left hand steer, line 79 becomes the pressure line and the fluid flow is reversed. This arrangement maintains the same displacement of hydraulic fluid in either right hand or left hand turning and therefore rotates front vertical shafts 70 through the same angle resulting in the swiveling of the wheel mounting units 40a and 40b about their respective swivel axes.

Figure 20:
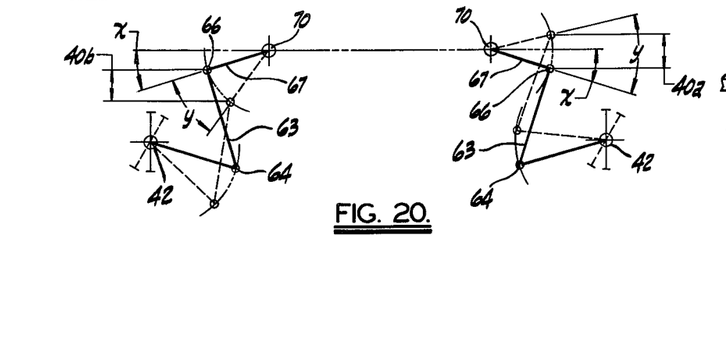
FIG. 20 is a diagrammatic representation of the geometrical relationship of a portion of the steering linkage of the vehicle.

It will be observed from FIG. 4 that the arms 67 of the wheel mounting units 40a and 40b are not initially parallel. The result of such a geometrical relationship as shown schematically in FIG. 20 is that while counter-clockwise rotation of the arm 70 associated with unit 40a may be substantially the same as that of the arm 70 associated with unit 40b, the relative longitudinal movement of the pivot connections 66 at the ends of said arms is different. The differential movement can be expressed geometrically as follows:

Movement of unit 40a pivot 66 = $\sin x + L \sin (y-x)$
Movement of unit 40b pivot 66 = $\sin (x + y) - L \sin x$ For example, if each arm 67 is 10 inches long and initial angle of each arm 67 is 15° in the respective directions shown in FIG. 4, a 35° counterclockwise rotation of arm 67 of unit 40a and 40b would result in a longitudinal movement of associated pivot connection 66 of said units of approximately 6 inches and 5 inches respectively. Further, the initial, oppositely inclined direction of links 63 of units 40a and 40b relative to the longitudinal axis of the vehicle causes a different angle of swivel to be produced in associated wheel units. The advantageous result of these geometrical relationships is that the turning radius of the inner wheels is smaller than the turning radius of the outer wheels which greatly facilitates turning. This is important particularly in four wheel steer because, as will be described later, the rear wheels are driven wheels.

Figure 6:
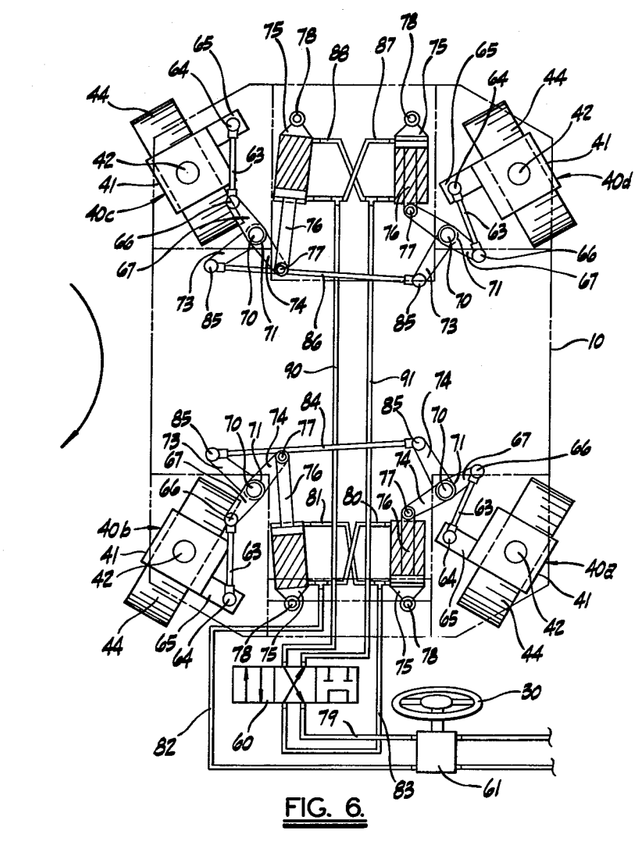
FIG. 6 is a similar schematic illustrating the four-wheel steering mode.
Figure 7:
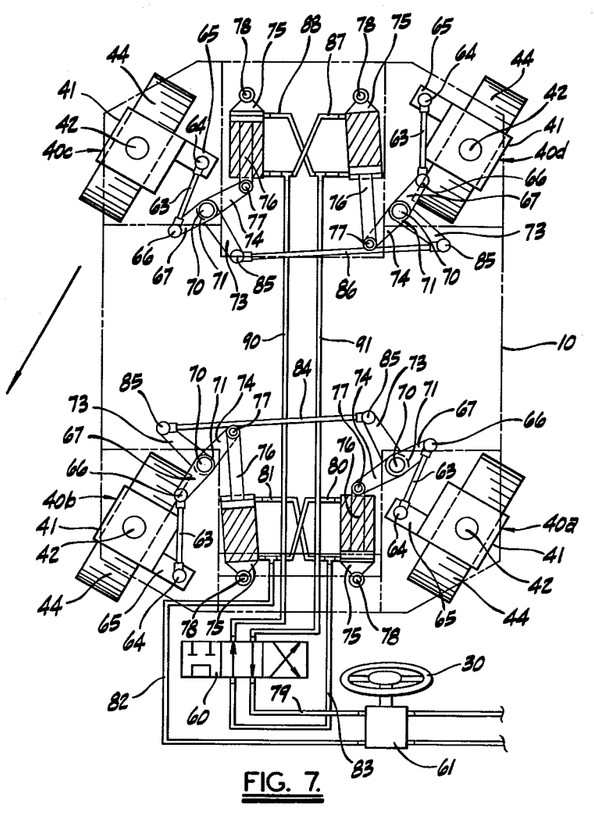
FIG. 7 is a similar schematic illustrating the crab steering mode.
Figures 8, 15:
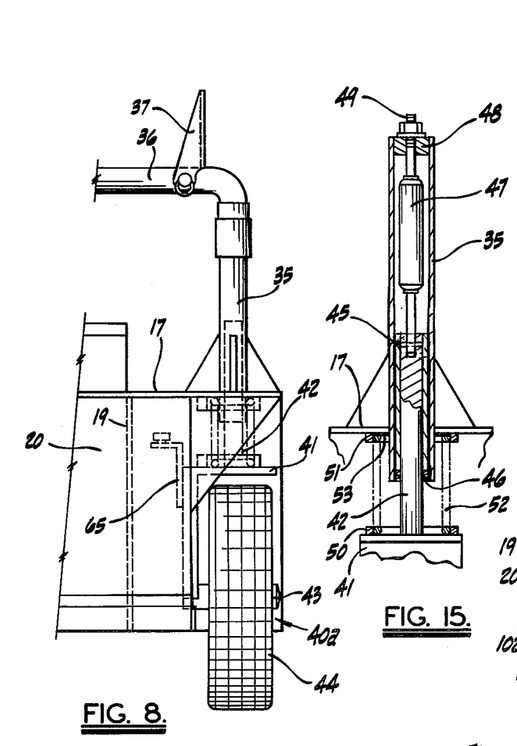
FIG. 8 is an enlarged, fragmentary front elevational view of the self-propelled vehicle.
FIG. 15 is an enlarged, fragmentary longitudinal section taken through the suspension tower.

FIG. 6 illustrates the four-wheel steering mode. This mode is accomplished by selectively switching the rear hydraulic cylinders 75 into the hydraulic steering circuit by means of the control valve 60. In this switching position, during right hand steer, fluid is directed from the directional valve 61, via pressure line 82 and line 80 to the rear port of cylinder 75 of unit 40a, and to the head port of cylinder 75 of unit 40b. Fluid from the head port of cylinder 75 of unit 40a, and the rear port of cylinder 75 of unit 40b, is directed via lines 81 and 83, through the control valve 60, and hence by lines 91 and 88 to the front port of cylinder 75 of unit 40c, and the rear port of cylinder 75 of unit 40d. Return is via lines 87 and 90, through the control valve 60 and line 79. During left hand steer, line 79 becomes the pressure line and the fluid flow is reversed.

When selecting a particular steering mode e.g. four-wheel steer, all wheels must be synchronized and aligned parallel, otherwise dog-tracking will occur. A visual indicator means is provided to ensure that this is properly achieved, as will be described later.

FIG. 7 illustrates the "crab" steering mode. This mode is also accomplished by selectively switching the rear hydraulic cylinders 75 into the hydraulic steering circuit by means of the control valve 60, but through a different, and opposite route from that used for the four wheel steering mode. In this switching position, during right hand steer, fluid is directed from the direction valve 61, via pressure line 82 and line 80 to the rear port of cylinder 75 of the unit 40a, and to the head port of cylinder 75 of unit 40b. Fluid from the head port of cylinder 75 of unit 40a and the rear port of cylinder 75 of unit 40b is directed via lines 81 and 83, through the control valve 60 and hence, by lines 90 and 87, to the rear port of cylinder 75 of unit 40c and the front port of cylinder 75 of unit 40d. Return is via lines 88, 91, through the valve 60 and line 79. During left hand steer, line 79 becomes the pressure line and the flow is reversed.

Figure 18:
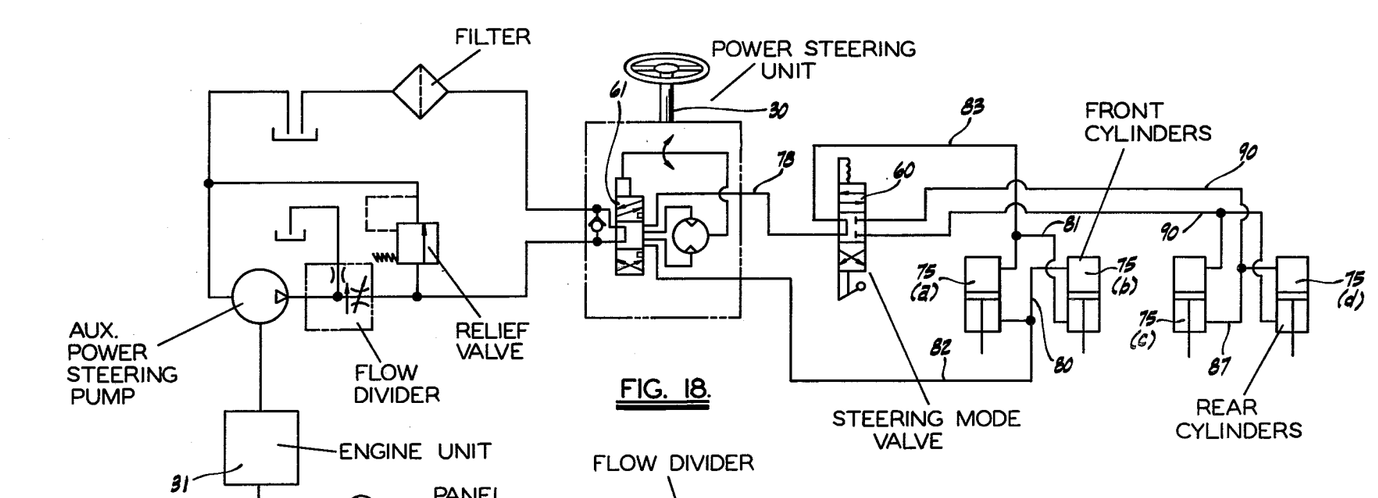
FIG. 18 is a schematic illustrating the hydraulic circuitry of the steering system of the self-propelled vehicle.
Figure 19:
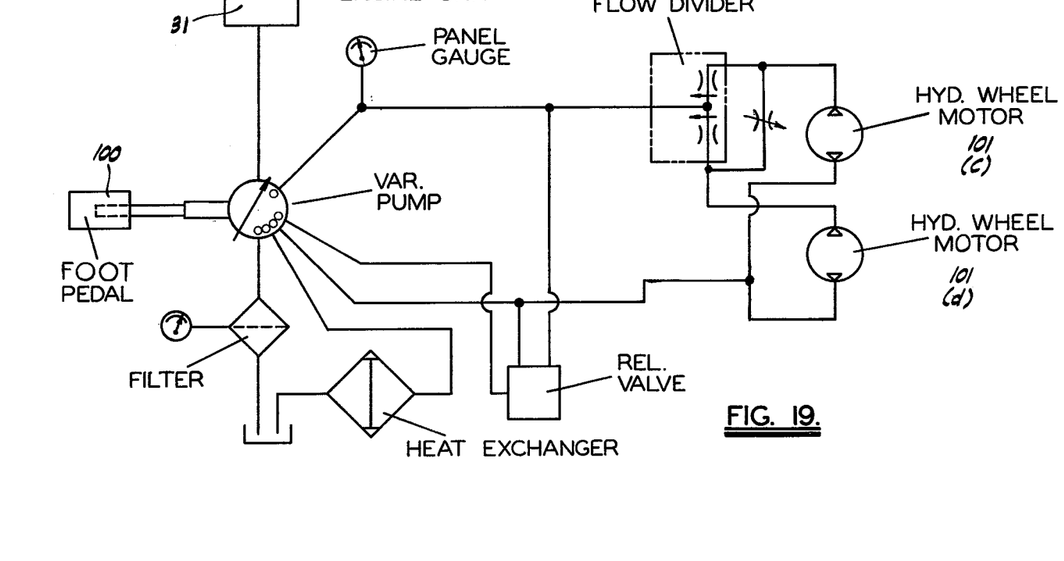
FIG. 19 is a schematic illustrating the hydraulic circuitry of the drive system.

The hydraulic system as a whole is shown in FIGS. 18 and 19. FIG. 18 illustrates the hydraulic system for the steering which includes an auxiliary power steering pump for unit 30, having the conventional components shown. The pump is driven by the motor unit 31, and supplies fluid for the power steering directional valve 61 and the front and rear hydraulic steering cylinders 75 as already described.

The hydraulic drive system is shown in FIG. 19 and includes a variable volume hydraulic pump, which is controlled by a single foot pedal 100, see FIG. 3. The drive system powers two hydraulic wheel motors 101, see FIG. 2, mounted in drive relation to each of the rear wheels 44 of rear units 40c and 40d. To this end, the rear wheel units 40c and 40d employ planetary gearboxes to carry said rear wheels in lieu of the stub shafts utilized for the front wheel units 40a and 40b. The pump is driven by the motor 31, and the foot pedal 100 controls forward and reverse as well as the speed of the unit. Positive speed is attained by the position of the pedal 100 which thereby acts also to brake the truck. The pedal 100 is pivotally mounted to the body 10 as by pivot 102 see FIG. 9 and operatively controls the hydraulic pump by means of connection 103 so that removal of the foot automatically brings the self-propelled vehicle 1 to a stop.

Positive traction of each of the rear driving wheels 44 in a forward direction is obtained by the use of a flow divider. This component divides the flow equally to each of the hydraulic motors 101, thus prohibiting a wheel "spin out" should one of the driving wheels be on snow, mud or some other slick surface. However, when the vehicle 1 is in a turn, the flow to each motor 101 is different, that is, the inner wheels turn less revolutions per minute than the outer wheels. When this occurs, the hydraulic drive system builds pressure as the motors 101 and flow divider valve work against each other. To prevent this, the hydraulic wheel motor flow divider is provided with an adjustable orifice valve in a crossover line on the output side of the flow divider. This arrangement provides that the flow differential adjusts to the flow required by each hydraulic motor when the vehicle 1 is in a turning mode but at the same time controls the flow sufficiently to provide a high degree of positive traction on said rear wheels.

The wheel alignment indicator means provides a means for visually aligning the front and rear wheel units 40a and 40d, and therefore the units 40b and 40c transversely connected to said units and is best described by reference to FIGS. 2, 3, 9 and 16. As shown in FIG. 3, the indicator means includes front and rear indicators generally shown by numerals 110 and 111. The front indicator 110, as shown in FIG. 9 includes a narrow marker element 112, extending in attached relation across an opening 113 provided in the fender upper plate 17, said opening and element constituting a fixed marker means. The upper end of shaft 70 extends into said opening 113 and includes a marker line 114 which indicates the swivel disposition of said shaft relative to the element 112, and consititutes a movable marker means. The rear indicator 111 differs from the front indicator 110 in that an extension tube 115, see FIG. 2, is provided above the opening 113 so that the operator can view the marker element 112, which is attached in extended relation across the end of the tube 115, above the rear seat 116 and, together with said tube opening constitutes a fixed marker means. The associated rear shaft 70 extends into the tube 115 so that the movable marker means provided by said associated marker line 114 will be visible. It will be understood that this arrangement is not required with respect to the operator's seat 117 or the removable front seats 118 because the operator's forward vision is not restricted. The marker elements 112 and the marker lines 114 of both indicators are calibrated so that when the marker lines 114 are disposed in alignment with the marker elements 112 the front and rear wheels are parallel with the longitudinal axis of the vehicle.

Figures 17, 17A:
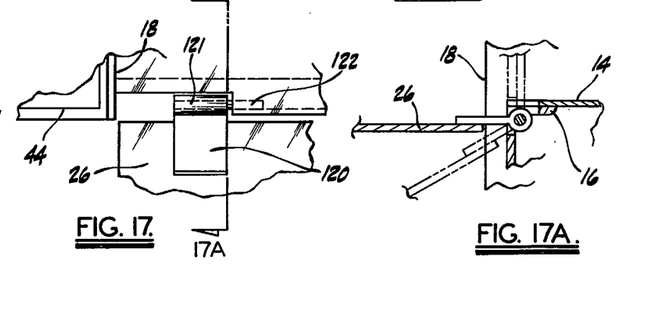
FIG. 17 is an enlarged, fragmentary plan view of the closure ramp of the self-propelled vehicle.
FIG. 17a is a cross-sectional view taken on line 17a of FIG. 17.

As already discussed, side door plates 25 and 26 are hinged to provide ramp members. FIGS. 17 and 17A indicate the nature of the hinge connection for door plate 26, which includes a strap 120 having a tubular end 121. The tubular end 121 is received within a notched opening 122 formed within the upper portion of the floor panel 11, said tubular end 121 receiving a pin 122 which is welded or otherwise attached to the floor panel adjacent the opening. The fender side plates 18 and 22 project outwardly of the floor panel 11 sufficiently so that only when the side door plate 26 is substantially in the same plane as the floor panel upper surface can the door plate be moved to the left for removal. Thus, in the closed position and the ramp position, see FIG. 17a, interference by the fender prevents inadvertent removal of said side door plate. The door plates 25 and 26 are held in the closed position by a latch system (not shown).

As shown in FIG. 17 the wheel 44 is spaced only a short distance from the fender side plate 18. This arrangement provides that when the wheel 44 suffers substantial impact it engages said fender plate. In this manner the wheel itself acts as a shock absorber and prevents damage to the suspension system and particularly the swivel shaft 42.

All of the seats except for the operator seat 117 are provided with means to effectuate their rapid removal to increase carrying capacity when the vehicle is utilized for cargo rather than personnel carrying. For example, the rear fender side plates 18 are provided with keyhole slots 130 (FIG. 1) and the back of the rear seat 118 is provided with cooperating projections 131 (FIG. 2).

Trailer Vehicle

Figure 11:
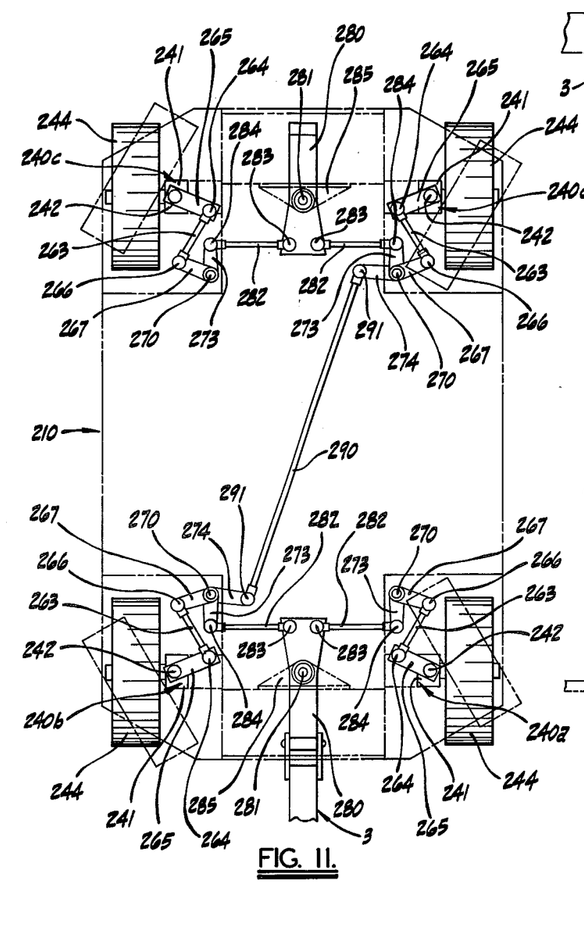
FIG. 11 is a schematic of the steering mechanism of the trailer vehicle.
Figures 12, 13, 14:
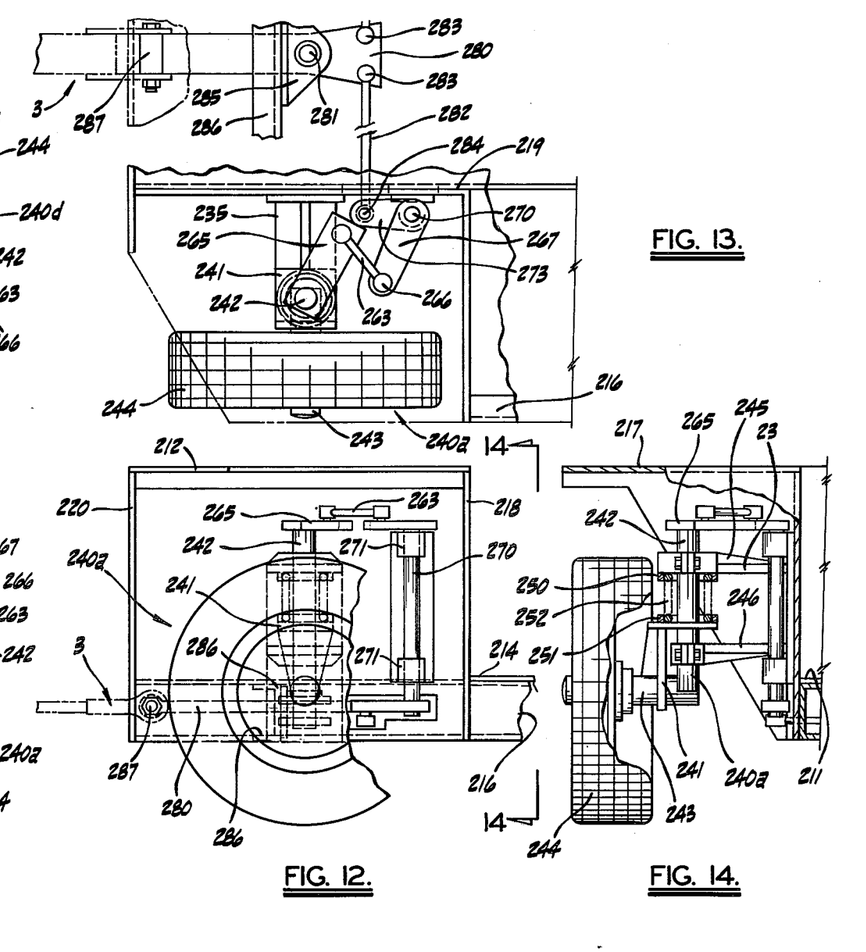
FIG 12 is an enlarged, fragmentary side elevational view of the trailer vehicle.
FIG. 13 is an enlarged, fragmentary plan view of said vehicle.
FIG. 14 is an enlarged, fragmentary view taken on line 14—14 of FIG. 12.

The trailer vehicle 2 is shown in FIGS. 1-3 and 11-14. As best shown in FIGS. 2 and 3 said vehicle includes a body 210, which consists essentially of floor panel 211 having opposed pairs of front and rear fender wells 212 which are substantially identical and are connected to the panel at the four corners thereof, as by welding, to form a substantially unitary structure which is substantially symmetrical about the longitudinal axis and an intermediate transverse axis. The floor panel 211, see FIG. 12, is formed from an upper floor plate 214 and a steel beam frame 216 disposed thereunder. The fender wells 212 are formed from upper plates 217, fender side plates 218 and inboard plates 219, and are interconnected by end plates 220. The body includes mounting brackets 235 at each corner welded, or otherwise attached thereto, which define vertical swivel axes, and receive individual wheel units, generally indicated by numerals 240a, 240b, 240c and 240d, in swivel relation. The wheel units are essentially identical and will be described with reference to the front right wheel unit 240a shown in FIGS. 12-14.

Each wheel mounting unit includes a yoke member 241 having a vertical swivel shaft 242, and a horizontal wheel shaft 243, fixedly attached thereto. The horizontal shaft 243 receives a ground wheel 244 in rotatable relation. The vertical swivel shaft 242 is rotatively received in swivel relation within the body bracket 235 as particularly shown in FIG. 14. The bracket 235 includes upper and lower outstanding arms 245 and 246 respectively, providing split bushings which receive the shaft 242 in journal relation. Yoke member 241 and the underside of the upper arm 244 are provided with retainer members 250 and 251 which receive opposite ends of a suspension spring 252. The swivel movement of all of the wheel units is controlled by hitch member 3, attached as by a conventional ball joint connector to a towing vehicle, through the medium of a steering means operatively connecting said hitch member 3 to said wheel units which will now be described with reference to the schematic rendering of FIG. 11 in conjunction with FIGS. 12–14.

The steering means provides the trailer vehicle 2 with a four-wheel steering mode, which permits said trailer to be turned in an extremely tight circle, and includes, as shown in FIG. 11, front and rear actuator members 280, constituting actuator means, which are operatively connected to the individual wheel units by a swiveling mechanism consisting of a plurality of linkage components. Except as shown, the components of the swiveling mechanism, which constitutes a swiveling means, are substantially symmetrically disposed both longitudinally and transversely and for this reason like parts are given the same reference numeral.

The yoke member 241 of each wheel unit 240a, 240b, 240c and 240d is pivoted about its associated swivel shaft 242 by means of the swiveling mechanism. The mechanism includes link member 263 attached by means of a pivot connection 264 to an eccentric bracket 265 which is attached in fixed relation to the upper end of said shaft 242. The other end of said member 263 is attached by means of a pivot connection 266 to the remote end of an arm 267 fixedly attached to the upper end of a vertical pivot shaft 270. The pivot shaft 70 constitutes a rotating means and is journal mounted within spaced sleeves 271, see FIG. 12, said sleeves being attached as by welding, to the body 210 at the corner of an associated fender well for rotation about a pivot axis disposed in spaced relation from the axis of rotation of the swivel shaft 242. Another arm indicated by numeral 273 is fixedly attached to the lower end of shaft 270. Rotation of said shaft 270 about its vertical axis, as by applying a force to said arm 273, results in rotation of said upper arm 267 and, by virtue of the inclined link member 263 connected between said arm and said bracket 265, results in the swiveling of unit 240a and attached wheel 244 about the swivel axis defined by the vertical shaft 242, said link member 263 and said arms 265 and 267 constituting means connecting said shafts 270 and 242.

In the preferred embodiment the front arms 273 are rotated by the actuating member 280. Member 280 is pivotally connected to the body 210 by a pivot connection 281, and is connected to said arms 273 by means of link members 282. The pivot connection of the actuator member 280 is provided by a pivot bracket assembly 285, attached to a body frame cross member 286. The link member 282 is connected between said actuator member 280 and said arm 273 by pivot connections 283 and 284 respectively. The front and rear wheel units are connected by virtue of arms 274, fixedly attached to the lower end of the shafts 270 associated with wheel units 240b and 240d, and a connecting link 290, which is pivotally connected to said arms 274 by pivot connections 291 disposed at the outer ends thereof and provides a means of connecting the front and rear wheel units together. The hitch 3 is connected to the actuator member 280 as by a removable horizontal pivot bolt connection 287.

It will be observed that in the preferred embodiment an actuator member 280 is provided at the rear end of the trailer vehicle 2 as well as the front end, so that the hitch 3 can be connected to either end. When the hitch 3 is connected to the front end, the actuator 280 at the rear end cooperates with the link members 282 to connect arms 273 and pivots freely to mirror the movements of the actuator at the front end.

The arms 267 associated with the two front wheel units and the two rear wheel units are not initially parallel. In addition, the link members 263 are initially inclined in opposite directions relative to the longitudinal axis of the vehicle. The result of this is that the turning radius of the inner wheels is smaller than the turning radius of the outer wheels which facilitates turning and reduces frictional wear on the wheels.

The operation of the steering mechanism is simple. Thus, when a towing vehicle turns to the operator's left side, the hitch 3 moves the front actuator member 280 in counter-clockwise direction, see FIG. 11, which rotates the arms 273 of front wheel units 240a and 240b in a clockwise direction and, by virtue of arm 274 of units 240b and 240d and the connecting link 290, rotates the arms 273 of rear wheel units 240c and 240d, in a counter-clockwise direction with the result that the front and rear wheels move to the left hand disposition, shown in phantom outline, to follow the direction of the towing vehicle.

As will be readily understood the disposition of the linkage components within the fender wells 212 and 213 and below the floor plate 214 produces a large symmetrical cargo area with no interference from the moving parts of the vehicle.

We claim as our invention:

1. A carrier vehicle comprising:
   (a) a body including a longitudinal axis, a front end having a pair of transversely disposed vertical swivel axes, and a pair of associated vertical pivot axes each disposed in spaced relation from its said front vertical swivel axes, and a rear end having a pair of transversely disposed vertical swivel axes, and a pair of associated vertical pivot axes, each disposed in spaced relation from its said rear vertical swivel axes,
   (b) a pair of front wheel means mounted to the body for rotation about said front vertical swivel axes,
   (c) a pair of rear wheel means mounted to the body for rotation about said rear vertical swivel axes, and
   (d) steering means including:
      (1) actuating means mounted to the body,
      (2) swiveling means including front and rear rotating means mounted to the body for rotation about said front and rear vertical pivot axes and having upper and lower portions, means operatively connecting said actuating means to said rotating means lower portions for rotation about said front and rear vertical pivot axes, and means operatively connecting said rotating means upper portions to associated wheel means for swiveling of said wheel means about said front and rear vertical swivel axes.

2. A carrier vehicle as defined in claim 1, in which:
   (e) the means connecting the rotating means upper portion to the associated wheel means includes link means connected to each of said rotating means upper portion and wheel means in offset relation to the said front and rear vertical swivel axes and said front and rear vertical pivot axes.

3. A carrier vehicle as defined in claim 2, in which:
   (f) each link means between the rotating means upper portion and the wheel means includes a longitudinal axis between said offset connections disposed in inclined relation to the longitudinal axis of the body, said link axes on one side of the body being oppositely inclined to the corresponding link axes on the other side of the body.

4. A carrier vehicle as defined in claim 1, in which:
(e) each rotating means includes pivot shaft means mounted to the body for rotation about said front and rear vertical pivot axes and transversely disposed upper and lower arm means rotatable with said shaft means and providing said upper and lower portions,
(f) each wheel means includes swivel shaft means mounted to the body for rotation about said front and rear vertical swivel axes and transversely disposed arm means rotatable with said shaft means, and
(g) the means connecting the rotating means to the wheel means include link means interconnecting each of said upper arm means to the rotating means to the arm means of the associated wheel means.

5. A carrier vehicle as defined in claim 4, in which:
(h) each upper arm means of the rotating means includes a longitudinal axis, said longitudinal axes on one side of the body being oppositely inclined to the corresponding axes on the other side of the body.

6. A carrier vehicle as defined in claim 4, in which:
(h) the means operatively connecting the actuating means to the rotating means includes transverse link means interconnecting the lower arm means of the front rotating means and transverse link means interconnecting the lower arm means of the rear rotating means.

7. A carrier vehicle as defined in claim 1, in which:
(e) the swiveling means includes control valve means,
(f) the means connecting the actuating means to the front and rear rotating means includes hydraulic ram means connected in drive relation to associated rotating means, said hydraulic ram means having a fluid supply means connected to the control valve means, said control valve means selectively controlling fluid supply to said ram means to determine the swivel direction of said front wheel means independently of or together with the swivel direction of said rear wheel means.

8. A carrier vehicle as defined in claim 1, in which:
(e) the body includes intermediate floor means and front and rear fender means disposed above the floor means, each of said fender means housing an associated wheel means, and each of said fender means includes a tower means disposed above said wheel means and said rotating means in coaxial relation with said front and rear vertical swivel axes and
(f) each wheel means includes swivel shaft means mounted in journal relation within an associated tower means, and suspension means operatively disposed between said fender means and said shaft means.

9. A carrier vehicle as defined in claim 1, in which:
(e) the actuating means includes a single steering wheel operatively controlling the swivel direction of the front wheel means independently of or together with the swivel direction of the rear wheel means.

10. A carrier vehicle comprising:
(a) a body including a longitudinal axis, a front end having a pair of transversely disposed vertical swivel axes and a rear end having a pair of transversely disposed vertical swivel axes,
(b) a pair of front wheel means mounted to the body for rotation about said front vertical swivel axes,
(c) a pair of rear wheel means mounted to the body for rotation about said rear vertical swivel axes,
(d) steering means including:
   (1) actuating means mounted to the body,
   (2) swiveling means operatively connecting the actuating means to the front and rear wheel means for selectively swiveling said front and rear wheel means about said front and rear vertical swivel axes, and
   (3) indicator means operatively connected to one of said front wheel means and one of said rear wheel means for visually indicating the relative swivel position of the front and rear wheel means.

11. A carrier vehicle as defined in claim 10, in which:
(e) the swiveling means includes manually operated control valve means.
(f) the means connecting the actuating means to the front and rear wheel means includes hydraulic ram means connected in drive relation to associated wheel means, said hydraulic ram means having a fluid supply means connected to the control valve means, said control valve means selectively controlling fluid supply to said ram means to determine the swivel direction of said front and rear wheel means.

12. A carrier vehicle as defined in claim 10, in which:
(e) the body includes a pair of front vertical pivot axes each disposed in spaced relation from said front vertical swivel axes and a pair of rear vertical swivel axes each disposed in spaced relation from said rear vertical swivel axes,
(f) the swiveling means includes front and rear vertical rotating means mounted to the body for rotation about said front and rear vertical pivot axes, means operatively connecting said rotating means to the actuating means, and means operatively connecting said rotating means to said wheel means, and
(g) the indicator means includes a marker means carried by and rotatable with one of said front rotating means and an associated marker means disposed in fixed relation to the body, and a marker means carried by and rotatable with one of said rear rotating means and an associated marker means disposed in fixed relation to the body.

13. A carrier vehicle as defined in claim 12, in which:
(h) the swiveling means includes manually operated control valve means,
(i) the means connecting the actuating means to the front and rear rotating means includes hydraulic ram means connected in drive relation to associated rotating means, said hydraulic ram means having a fluid supply means connected to the control valve means, said control valve means selectively controlling fluid supply to said ram means to determine the swivel direction of said front and rear wheel means, said valve means being adapted to be manually movable to a selected position when the front and rear rotatable marker means are in indicator relation with the associated front and rear fixed marker means to indicate substantial parallel alignment of the front and rear wheel means.

14. A carrier vehicle as defined in claim 13, in which:
(j) said one front rotating means carrying said marker means includes a pivot shaft means journal mounted to the body and carrying said marker means at the upper end thereof, and said one rear rotating means includes a pivot shaft means journal mounted to the body and carrying said marker means at the upper end thereof, and (k) the body marker means includes front and rear openings revealing movement of associated shaft marker means, said openings having marker elements disposed in fixed relation to said associated shaft marker means.

15. A carrier vehicle as defined in claim 10, in which:
(e) drive means is provided including:
  (1) hydraulic motor means mounted to each of said rear wheel means and having fluid supply means,
  (2) flow divider means operatively connected between said fluid supply means and motor means, said flow divider means having output means operatively connected to each of said motor means, and
  (3) adjustable orifice valve means operatively connected between said output means to selectively control flow to the motor means when the vehicle is turning.

16. A carrier vehicle comprising:
(a) a body including a longitudinal axis, a front end having a pair of transversely disposed vertical swivel axes and a rear end having a pair of transversely disposed vertical swivel axes,
(b) a pair of front wheel means mounted to the body for rotation about said front vertical swivel axes,
(c) a pair of rear wheel means mounted to the body for rotation about said rear vertical swivel axes,
(d) steering means including:
  (1) actuating means mounted to the body,
  (2) swiveling means including means operatively connecting the actuating means to each of said front wheel means, link means operatively connecting one of said front wheel means to one of said rear wheel means at an inclined angle relative to said longitudinal axis, and means operatively connecting said rear wheel means to each other for swiveling said front wheel means in one direction and the rear wheel means in the opposite direction about said front and rear vertical swivel axes when said actuating means is actuated.

17. A carrier vehicle as defined in claim 16, in which:
(e) said means connecting said front wheel means and said rear wheel means includes a rigid link extending between a front wheel means on one side of said longitudinal axis and a rear wheel means on the other side of said longitudinal axis.

18. A carrier vehicle as defined in claim 16, in which:
(e) the body includes a pair of front vertical pivot axes each disposed in spaced relation from an front said vertical swivel axes and a pair of rear vertical swivel axes each disposed in spaced relation from said rear vertical swivel axes, and
(f) the swiveling means includes front and rear rotating means each including a pivot shaft means mounted to the body for rotation about said front and rear vertical pivot axes, means operatively connecting said rotating means to the actuating means, and means operatively connecting said rotating means to said wheel means.

19. A carrier vehicle as defined in claim 18, in which:
(g) one of said front pivot shaft means includes a transverse arm means and one of said rear pivot shaft means includes a transverse arm means and said link means is operatively connected between said arm means in spaced relation from said front and rear vertical pivot axes.

20. A carrier vehicle as defined in claim 18, in which:
(g) each of said front and rear pivot shaft means includes transversely disposed upper and lower arm means rotatable with said shaft means,
(h) one of said front pivot shaft means includes a second transversely disposed lower arm means rotatable with said shaft means and one of said rear shaft means includes a second transversely disposed lower arm means rotatable with said shaft means,
(i) each of said front and rear wheel means includes a swivel shaft means mounted to the body for rotation about said front and rear vertical swivel axes and transversely disposed arm means rotatable with said shaft means,
(j) the means connecting the rotating means to the wheel means include link means interconnecting said upper arm means of the pivot shaft means to the arm means of the associated wheel means,
(k) the link means connecting one of said front wheel means to one of said rear wheel means extends between said second lower arm means of said front and rear pivot shaft means.

21. A carrier vehicle as defined in claim 20, in which:
(l) the link means interconnecting said upper arm means of the pivot shaft means to the arm means of the associated wheel means each include a longitudinal axis disposed in inclined relation to the longitudinal axis of the body, the link axes on one side of the longitudinal axis of the body being oppositely inclined to the corresponding link axes on the other side of the body.

22. A carrier vehicle as defined in claim 21, in which:
(m) each upper arm means of the pivot shaft means includes a longitudinal axis, said longitudinal axes on one side of the body being oppositely inclined to the corresponding axes on the other side of the body.

23. A carrier vehicle as defined in claim 18, in which:
(g) the body includes a floor means and front and rear fender means disposed above the floor means and formed substantially symmetrically about the body longitudinal axis, said front and rear ends of said body being formed substantially in mirror image of each other,
(h) each pivot shaft means, wheel means, and means connecting said pivot shaft means and said wheel means is mounted within an associated fender means,
(i) the means connecting the actuating means to the pivot shaft means is disposed substantially below the floor means.

24. A carrier vehicle comprising:
(a) a body including a longitudinal axis, a front end having a pair of transversely disposed vertical swivel axes and a rear end having a pair of transversely disposed vertical swivel axes,
(b) a pair of front wheel means mounted to the body for rotation about said front vertical swivel axes,
(c) a pair of rear wheel means mounted to the body for rotation about rear said vertical swivel axes, and
(d) steering means including:
  (1) front actuating means mounted to the body, (2) rear actuating means mounted to the body, and (3) swiveling means including means operatively connecting the front and rear actuating means respectively to the front and rear wheel means and means operatively connecting said front and rear wheel means to each other for swiveling said front wheel means in one direction and the rear wheel means in the opposite direction about said front and rear vertical swivel axes when either one of said actuating means is actuated.

25. A carrier vehicle as defined in claim 24, in which:

(e) each of said front and rear actuating means includes a hitch connection means, and (f) at least one of said actuating means includes a hitch link member connectible between one of said hitch connection means and a towing vehicle.

26. A carrier vehicle as defined in claim 24, in which:

(e) the body includes a transverse axis disposed intermediate said ends, a pair of front vertical pivot axes each disposed in spaced relation from said front vertical swivel axes, and a pair of vertical swivel axes each disposed in spaced relation from said rear vertical swivel axes, (f) the swiveling means includes front and rear rotating means mounted to the body for rotation about said front and rear vertical pivot axes, link means operatively connecting the actuating means to the wheel means, link means operatively connecting the rotating means to the wheel means and inclined link means operatively connecting one of said front rotating means to one of said rear rotating means, and (g) except for said latter inclined link means, said link means are disposed substantially in symmetrical relation about the body longitudinal axis and about the body transverse axis.

27. A carrier vehicle comprising:

(a) a body including a longitudinal axis, a front end having a pair of transversely disposed vertical swivel axes, and a pair of associated vertical pivot axes each disposed in spaced relation from its said vertical swivel axes, (b) a pair of front wheel means mounted to the body for rotation about said front vertical swivel axes, (c) a pair of rear wheel means mounted to the body, and (d) steering means including:

(1) actuating means mounted to the body, (2) swiveling means including front rotating means mounted to the body for rotation about said front vertical pivot axes having upper and lower portions, means operatively connecting said actuating means to said rotating means lower portions for rotation about said pivot axes, and means operatively connecting said rotating means upper portions to associated wheel means for swiveling of said wheel means about said vertical swivel axes.

28. A carrier vehicle as defined in claim 27, in which:

(e) drive means is provided including:

(1) hydraulic motor means mounted to each of one pair of wheel means and having a fluid supply, (2) variable volume pump means connected to said fluid supply, and (3) control pedal means operatively connected to said pump means to selectively control the fluid supply to the motor means to determine the direction of travel of the vehicle.

29. A carrier vehicle comprising:

(a) a body including a longitudinal axis, a front end having a pair of transversely disposed vertical swivel axes, and a pair of associated vertical pivot axes each disposed in spaced relation from its said front vertical swivel axes, and a rear end having a pair of transversely disposed vertical swivel axes, and a pair of associated vertical pivot axes, each disposed in spaced relation from its said rear vertical swivel axes said body including floor means and front and rear fender means disposed above the floor means, (b) a pair of front wheel means mounted to the body for rotation about said front vertical swivel axes, (c) a pair of rear wheel means mounted to the body for rotation about said rear vertical swivel axes, (d) each of said wheel means being housed within an associated fender means, and (e) steering means including:

(1) actuating means mounted to the body, (2) swiveling means including front and rear rotating means mounted to the body for rotation about said front and rear vertical pivot axes, each of said rotating means being mounted within an associated fender means, means operatively connecting said actuating means to said rotating means for rotation about said pivot axes, said connecting means being disposed substantially below the floor means, and means operatively connecting said rotating means to associated wheel means for swiveling of said wheel means about said vertical axes, said connecting means being disposed substantially above the floor means.

30. A carrier vehicle as defined in claim 29, in which:

(f) removable side door means is provided between said front and rear fender means on at least one side of said body, and (g) said door means is hingedly connected to the body for movement between a closed position and a ramp position.

31. A carrier vehicle as defined in claim 30, in which:

(h) the front and rear fender means each include transversely disposed side portions, and (i) said door means is hingedly mounted to said floor means for arcuate movement between the closed position and the ramp position, said door means being mounted for longitudinal engagement with said body in the closed position and the ramp position but for clearance with said body in an intermediate, removal position.

32. A carrier vehicle as defined in claim 29, in which:

(f) the wheel means includes yoke means carrying ground wheels mounted in rotatable relation and swivel shaft means carried by the yoke means and mounted to the body for rotation about said front and rear vertical swivel axes, and (g) the front fender means include transversely disposed side portions adjacent the wheel periphery and engageable by the wheel in cushion relation upon a predetermined impact to said wheel.

33. A carrier vehicle comprising:

(a) a body including a longitudinal axis, a front end having a pair of transversely disposed vertical swivel axes, and a pair of associated vertical pivot axes each disposed in spaced relation from its said front vertical swivel axes, and a rear end having a pair of transversely disposed vertical swivel axes, and a pair of associated vertical pivot axes, each disposed in spaced relation from its said rear vertical swivel axes, said body including front and rear fender means disposed above the floor means, each of said fender means including a tower means disposed in coaxial relation to said front and rear vertical swivel axes, (b) a pair of front wheel means mounted to the body for rotation about said front vertical swivel axes, (c) a pair of rear wheel means mounted to the body for rotation about said rear vertical swivel axes, (d) each of said wheel means being housed within an associated fender means below the tower means and each of said wheel means including yoke means carrying a swivel shaft means in fixed relation thereto said swivel shaft means being mounted in journal relation within an associated tower means and each of said wheel means including suspension means having a compression spring operatively extending between the yoke means and the fender means and a shock absorber mounted within the tower means, and (e) steering means including:
  (1) actuating means mounted to the body,
  (2) swiveling means including front and rear rotating means mounted to the body for rotation about said front and rear vertical pivot axes, means operatively connecting said actuating means to said rotating means for rotation about said vertical pivot axes, and means operatively connecting said front and rear vertical rotating means to associated wheel means for swiveling of said wheel means about said front and rear vertical swivel axes.

34. A carrier vehicle comprising:

(a) a body including a longitudinal axis, a front end having a pair of transversely disposed vertical swivel axes, and a pair of associated vertical pivot axes each disposed in spaced relation from its said front vertical swivel axes, and a rear end having a pair of transversely disposed vertical swivel axes, and a pair of associated vertical pivot axes, each disposed in spaced relation from its said rear vertical swivel axes said body including floor means and front and rear fender means disposed above the floor means, each of said fender means including a tower means disposed in coaxial relation to an associated swivel axis, the front tower means and the rear tower means each interconnected by a transverse member to provide front and rear roll bars respectively, (b) a pair of front wheel means mounted to the body for rotation about said front vertical swivel axes, (c) a pair of rear wheel means mounted to the body for rotation about said rear vertical swivel axes, (d) each of said wheel means being housed within an associated fender means below the tower means and each of said wheel means including swivel shaft means mounted in journal relation within an associated tower means and suspension means operatively disposed between said fender means and said shaft means, and (e) steering means including:
  (1) actuating means mounted to the body,
  (2) swiveling means including front and rear rotating means mounted to the body for rotation about said front and rear vertical pivot axes, means operatively connecting said actuating means to said rotating means for rotation about said pivot axes, and means operatively connecting said front and rear vertical rotating means to associated wheel means for swiveling of said wheel means about said front and rear vertical swivel axes.

* * * * *

UNITED STATES PATENT OFFICE
CERTIFICATE OF CORRECTION

Patent No. 4,090,581             Dated May 23, 1978

Inventor(s)   Earl L. Miner and Harold G. Jones

It is certified that error appears in the above-identified patent and that said Letters Patent are hereby corrected as shown below:

Claim 12:
   Column 12, Lines 35 and 36, delete "vertical".
Claim 18:
   Column 13, Line 55, delete "an" and insert -- said --.
   Column 13, Line 56, delete "said".
Claim 24:
   Column 14, Line 65, delete "rear said" and insert -- said rear --.
Claim 26:
   Column 15, Line 21, between "of" and "vertical" insert -- rear --.
Claim 29:
   Column 16, Line 31, between "vertical" and "axes" insert -- swivel --.
Claim 34:
   Column 18, Line 6, between "axes" and "said" insert -- , --.

Signed and Sealed this

Sixth Day of March 1979

[SEAL]

Attest:

RUTH C. MASON
*Attesting Officer*

DONALD W. BANNER
*Commissioner of Patents and Trademarks*